United States Patent
Watanabe

(10) Patent No.: US 10,618,161 B2
(45) Date of Patent: Apr. 14, 2020

(54) ROBOT

(71) Applicant: FANUC CORPORATION, Yamanashi (JP)

(72) Inventor: Kei Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 56 days.

(21) Appl. No.: 15/915,182

(22) Filed: Mar. 8, 2018

(65) Prior Publication Data

US 2018/0281174 A1    Oct. 4, 2018

(30) Foreign Application Priority Data

Mar. 30, 2017    (JP) .................................. 2017-066576

(51) Int. Cl.
*B25J 9/04*    (2006.01)
*B25J 9/12*    (2006.01)
(Continued)

(52) U.S. Cl.
CPC ............. *B25J 9/046* (2013.01); *B25J 9/0009* (2013.01); *B25J 9/04* (2013.01); *B25J 9/06* (2013.01);
(Continued)

(58) Field of Classification Search
CPC ... B25J 9/0009; B25J 9/046; B25J 9/06; B25J 9/126; B25J 19/0025; Y10S 901/15; Y10S 901/23; Y10S 901/28; Y10S 901/29
(Continued)

(56) References Cited

U.S. PATENT DOCUMENTS 4,507,044 A    3/1985  Hutchins et al.
9,073,218 B2 *  7/2015  Watanabe ............ B25J 19/0075
(Continued)

FOREIGN PATENT DOCUMENTS

CN    105108735 A    12/2015
CN    204818516 U    12/2015
(Continued)

OTHER PUBLICATIONS

Decision to Grant a Patent dated Feb. 19, 2019 in corresponding Japanese Application No. 2017-066576; 6 pages.
(Continued)

*Primary Examiner* — Victor L MacArthur
*Assistant Examiner* — Joseph Brown
(74) *Attorney, Agent, or Firm* — Maier & Maier, PLLC

(57) ABSTRACT

A robot includes: a turning part rotated about a first axis; a first arm part rotatably connected to the turning part about a second axis perpendicular to the first axis; a second arm part rotatably connected to the first arm part about a third axis; a distal-end swing part rotatably connected to the second arm part about a fourth axis; actuators rotating the first arm part, the second arm part, and the distal-end swing part about the second to fourth axes, which are parallel to each other, respectively; and a cable for the actuators. The turning part, the first arm part, the second arm part, and the distal-end swing part are alternately arranged at one or the other side in the direction of the second axis. The cable is disposed along side surfaces at the one side. The actuators are disposed close to side surfaces at the other side.

2 Claims, 8 Drawing Sheets

(51) Int. Cl.
    *B25J 9/06*     (2006.01)
    *B25J 19/00*     (2006.01)
    *B25J 9/00*     (2006.01)
    *B25J 9/10*     (2006.01)

(52) U.S. Cl.
    CPC ............... *B25J 9/10* (2013.01); *B25J 9/126* (2013.01); *B25J 19/0025* (2013.01); *Y10S 901/15* (2013.01); *Y10S 901/23* (2013.01); *Y10S 901/29* (2013.01)

(58) Field of Classification Search
    USPC .......................................... 74/490.01, 490.02
    See application file for complete search history.

(56) References Cited

U.S. PATENT DOCUMENTS

| | | | | |
|---|---|---|---|---|
| 9,216,479 | B2* | 12/2015 | Takahashi | B23K 37/02 |
| 9,815,202 | B2* | 11/2017 | Osaka | B25J 9/1692 |
| 10,245,725 | B2* | 4/2019 | Ogawara | B25J 9/1633 |
| 2005/0011295 | A1 | 1/2005 | Shiraki et al. | |
| 2006/0196300 | A1 | 9/2006 | Kidooka et al. | |
| 2008/0092689 | A1 | 4/2008 | Shiraki et al. | |
| 2010/0162845 | A1* | 7/2010 | Yonehara | B25J 9/046 74/490.01 |
| 2014/0013893 | A1* | 1/2014 | Asano | B25J 18/00 74/490.02 |
| 2014/0060231 | A1 | 3/2014 | Watanabe | |
| 2014/0103168 | A1* | 4/2014 | Kume | B25J 19/0025 248/51 |
| 2014/0137685 | A1 | 5/2014 | Iwayama | |
| 2014/0290415 | A1* | 10/2014 | Hasuo | B25J 19/0025 74/490.02 |
| 2015/0027261 | A1* | 1/2015 | Okahisa | B25J 18/04 74/490.02 |
| 2016/0067870 | A1* | 3/2016 | Kono | B25J 19/0025 248/52 |
| 2016/0121480 | A1 | 5/2016 | Okahisa et al. | |
| 2016/0129588 | A1* | 5/2016 | Pfaff | B25J 9/0081 700/256 |
| 2016/0136813 | A1 | 5/2016 | Hiro et al. | |
| 2016/0250759 | A1 | 9/2016 | Watanabe | |
| 2016/0256999 | A1 | 9/2016 | Kinoshita et al. | |
| 2016/0263747 | A1 | 9/2016 | Yokoi | |
| 2018/0065254 | A1 | 3/2018 | Okahisa et al. | |
| 2018/0229362 | A1 | 8/2018 | Kinoshita et al. | |

FOREIGN PATENT DOCUMENTS

| | | |
|---|---|---|
| CN | 105899334 A | 8/2016 |
| CN | 106002980 A | 10/2016 |
| EP | 3034249 A1 | 6/2016 |
| EP | 3 064 324 A1 | 9/2016 |
| EP | 3 067 166 A1 | 9/2016 |
| EP | 3213883 A1 | 9/2017 |
| JP | S58-211888 A | 12/1983 |
| JP | S60-259397 A | 12/1985 |
| JP | S63-288692 A | 11/1988 |
| JP | S64-046189 A | 2/1989 |
| JP | S64-46189 U | 3/1989 |
| JP | H04-17084 U | 2/1992 |
| JP | H11-277481 A | 10/1999 |
| JP | 2003-136462 A | 5/2003 |
| JP | 2013-123760 A | 6/2013 |
| JP | 2014-046398 A | 3/2014 |
| JP | 2014-100743 A | 6/2014 |
| JP | 5975129 B | 8/2016 |
| JP | 2016-159399 A | 9/2016 |
| JP | 2016-168651 A | 9/2016 |
| WO | 2017/002208 A1 | 1/2017 |

OTHER PUBLICATIONS

Memorandum of Decision to Grant a Patent dated Feb. 13, 2019 in corresponding Japanese Application No. 2017-066576; 2 pages.
Japanese Office Action dated Dec. 11, 2018, in connection with corresponding JP Application No. 2017-066576 (11 pgs., including machine-generated English translation).
Webpage: KUKA youBot developers, URL: https://web.archive.org/web/20161103102207/http://www.youbot-store.com/developers/kuka-youbot-kinematics-dynamics-and-3d-model-81; dated Nov. 3, 2016, 1 pg.
Office Action dated May 27, 2019, in corresponding Chinese Application No. 201810226796.0; 14 pages.

* cited by examiner

ROBOT

CROSS-REFERENCE TO RELATED APPLICATIONS

This application is based on Japanese Patent Application No. 2017-066576, the content of which is incorporated herein by reference.

FIELD

The present invention relates to a robot.

BACKGROUND

In the related art, there is a known 7-axis robot that is provided with: a turning part that is rotated about a first axis; a first arm part that is connected to the turning part in a rotatable manner about a second axis extending along a direction perpendicular to the first axis; a second arm part that is connected to the first arm part in a rotatable manner about a third axis parallel to the second axis; and a distal-end swing part that is connected to the second arm part in a rotatable manner about a fourth axis parallel to the third axis and that supports a 3-axis-structure wrist part at the distal end thereof (for example, see PTL 1).

In the 7-axis robot of PTL 1, one of the first arm part and the second arm part is bent in a crank manner in the direction along the third axis in the vicinity of the third axis, which is a connection part between the first arm part and the second arm part, thereby reducing the difference in lateral position between side surfaces on one side of the first arm part and the second arm part in the direction along the third axis, actuators for driving the first arm part, the second arm part, and the distal-end swing part are disposed on side surfaces on the other side thereof, and a cable for supplying power to the actuators is wired along the side surfaces on the one side thereof.

SUMMARY

The present invention provides the following solutions.

According to one aspect, the present invention provides a robot including: a turning part that can be rotated about a first axis; a first arm part that is connected to the turning part in a rotatable manner about a second axis extending in a direction perpendicular to the first axis and that extends straight along the longitudinal direction thereof; a second arm part that is connected to the first arm part in a rotatable manner about a third axis parallel to the second axis and that extends straight along the longitudinal direction thereof; a distal-end swing part that is connected to the second arm part in a rotatable manner about a fourth axis parallel to the third axis and that supports a wrist part at the distal end thereof; a first actuator that rotates the first arm part with respect to the turning part; a second actuator that rotates the second arm part with respect to the first arm part; a third actuator that rotates the distal-end swing part with respect to the second arm part; and a cable that supplies power and signals to the first to third actuators, wherein the turning part, the first arm part, the second arm part, and the distal-end swing part are arranged in an alternating manner at one side or at the other side in the direction along the second axis, from the turning part toward the distal-end swing part; the cable is disposed along a side surface at the one side; and the first to third actuators are disposed close to a side surface at the other side.

DETAILED DESCRIPTION

A robot 1 according to one embodiment of the present invention will be described below with reference to the drawings.

Figure 1:
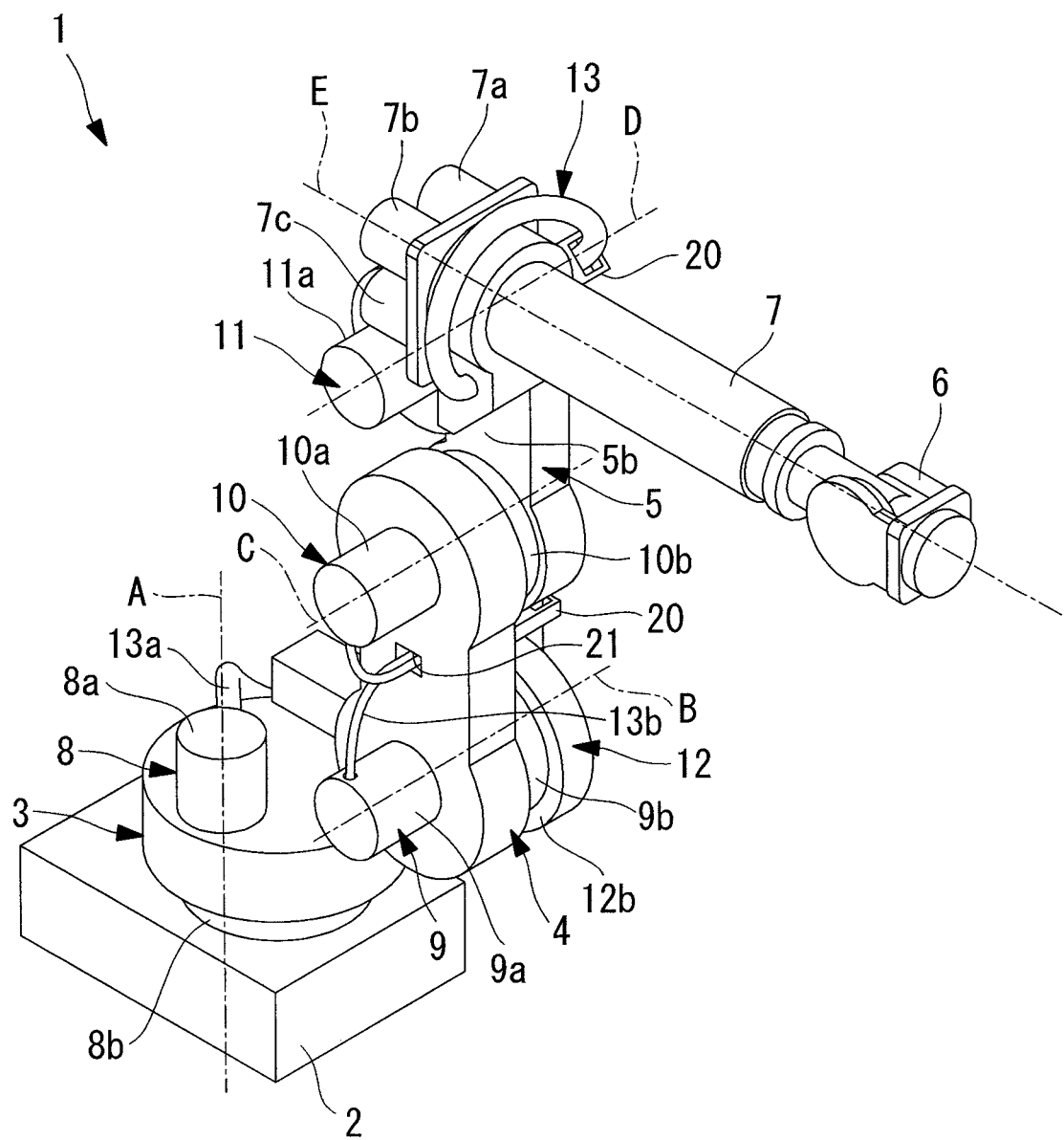
FIG. 1 is a perspective view of a robot according to one embodiment of the present invention, viewed diagonally from the front left.
Figure 2:
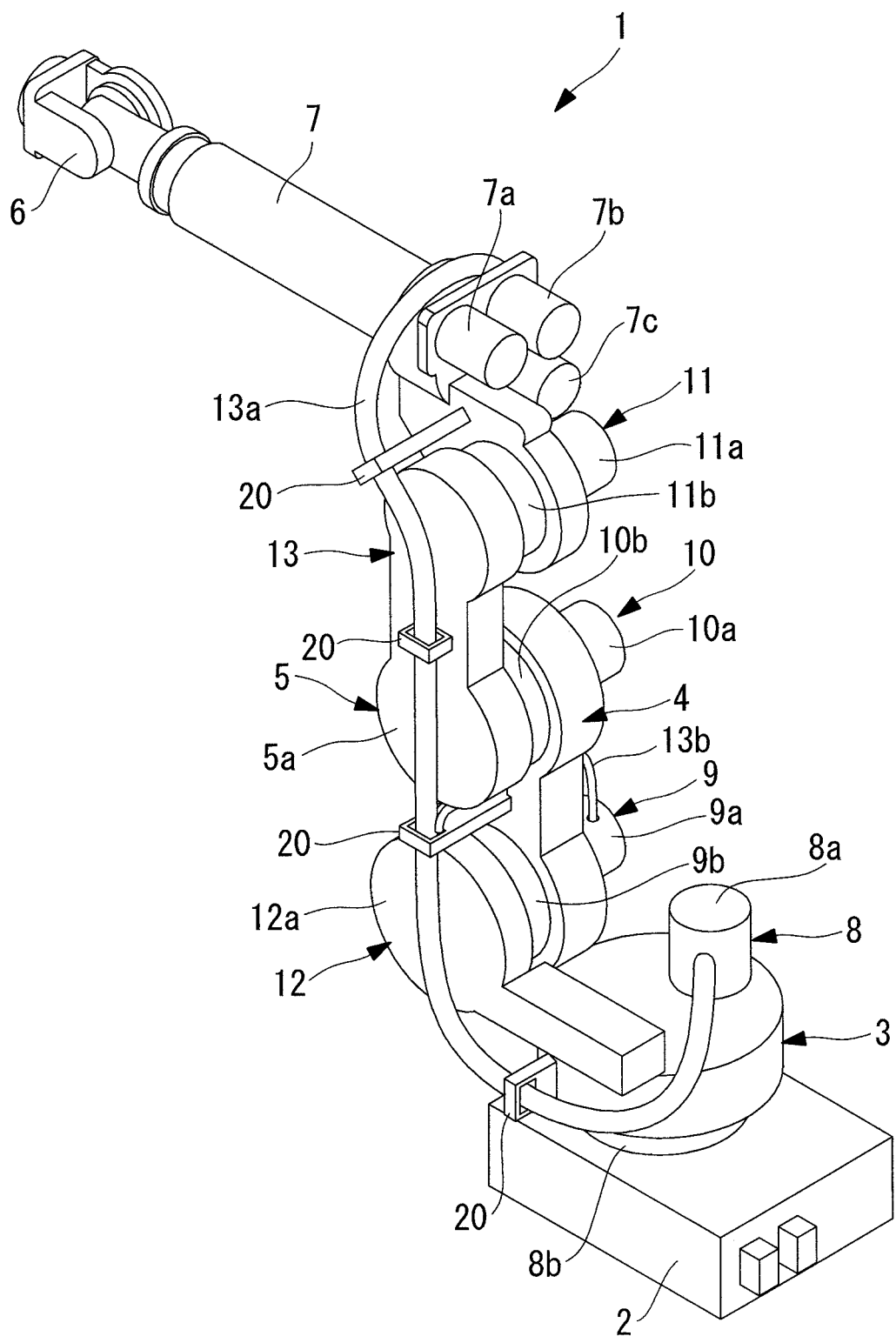
FIG. 2 is a perspective view of the robot shown in FIG. 1, viewed diagonally from the back right.
Figure 3:
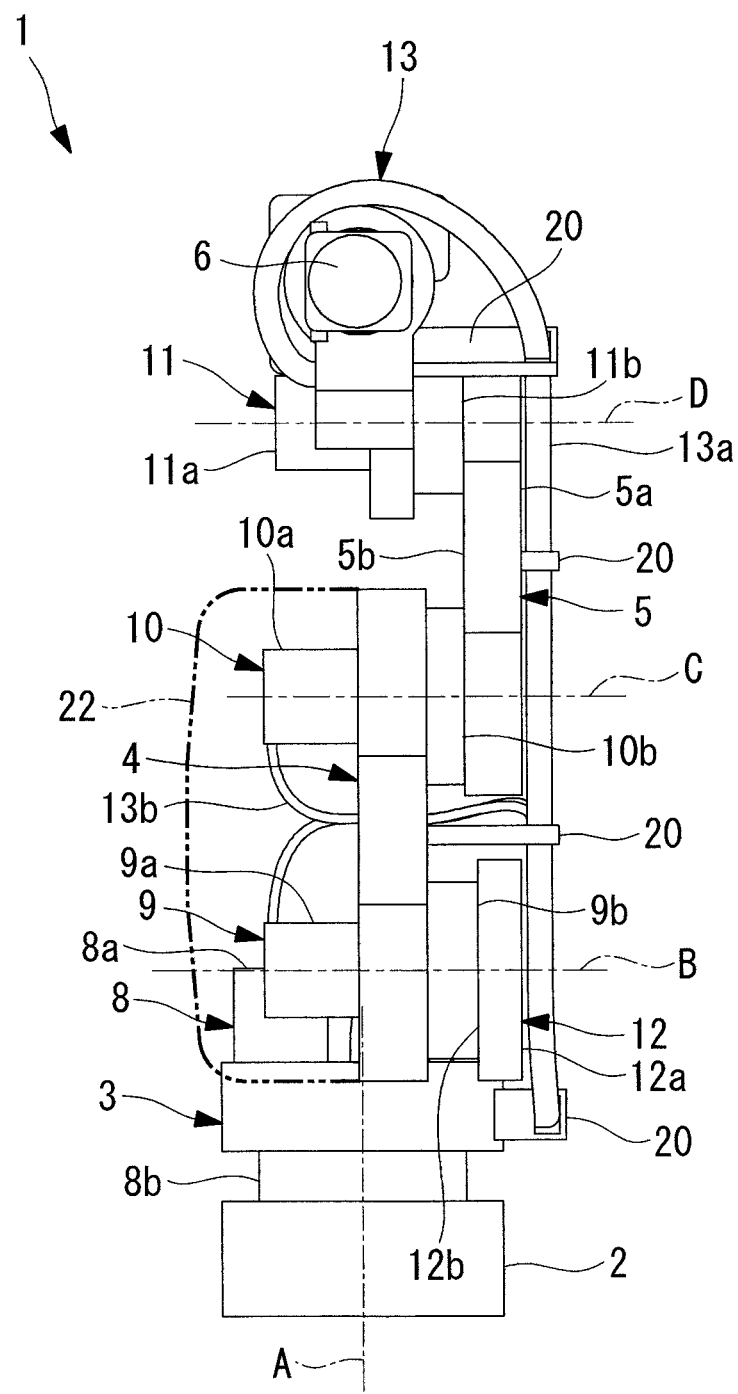
FIG. 3 is a front view of the robot shown in FIG. 1.

As shown in FIGS. 1 to 3, the robot 1 of this embodiment is a 7-axis robot that is provided with: a turning part 3 that is supported in a rotatable manner about a first axis A that is vertical with respect to a base 2 installed on the horizontal floor surface; a first arm part 4 that is supported by the turning part 3 in a rotatable manner about a horizontal second axis B; a second arm part 5 that is supported by the first arm part 4 in a rotatable manner about a third axis C parallel to the second axis B; and a distal-end swing part 7 that is supported by the second arm part 5 in a rotatable manner about a fourth axis D parallel to the third axis C and that supports, at the distal end thereof, a wrist part 6 having a 3-axis structure.

The turning part 3 is provided with an actuator 8 that includes a motor 8a and a reducer 8b, so that, through actuation of the actuator 8, the turning part 3 can be horizontally rotated about the first axis A with respect to the base 2.

Figure 4:
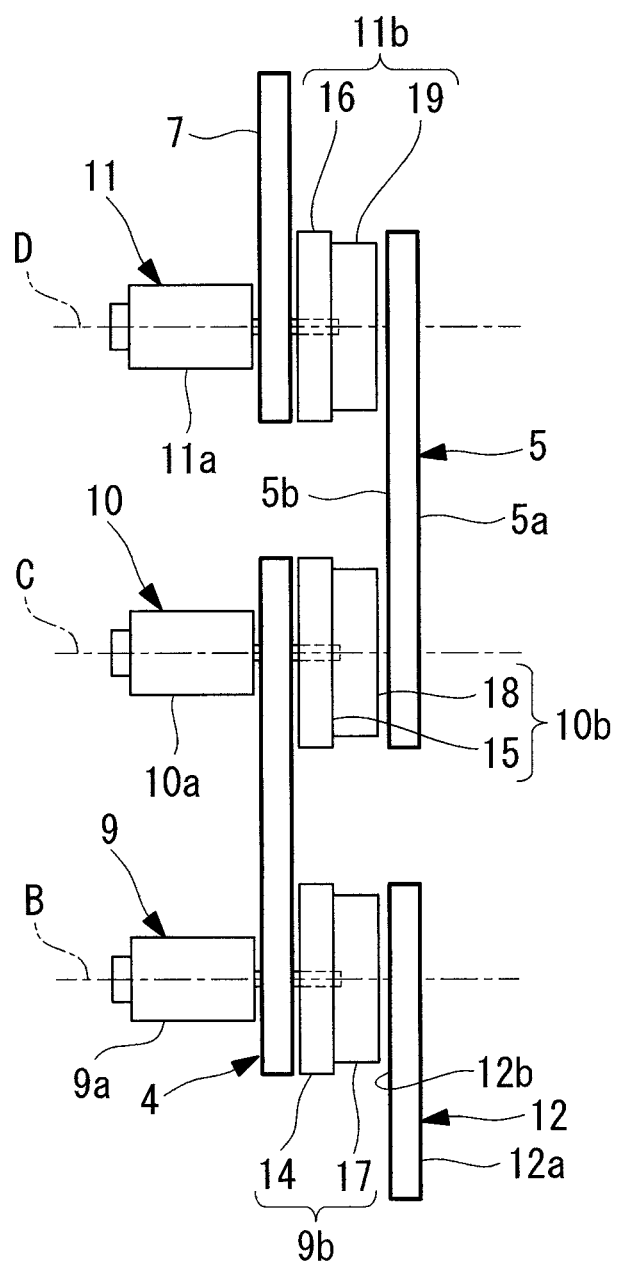
FIG. 4 is a front view schematically showing the robot shown in FIG. 1.

As schematically shown in FIG. 4, an actuator (first actuator) 9 that includes a motor 9a and a reducer 9b is provided between the first arm part 4 and the turning part 3 so as to allow the first arm part 4 to be rotated about the second axis B with respect to the turning part 3.

An actuator (second actuator) 10 that includes a motor 10a and a reducer 10b is provided between the second arm part 5 and the first arm part 4 so as to allow the second arm part 5 to be rotated about the third axis C with respect to the first arm part 4.

An actuator (third actuator) 11 that includes a motor 11a and a reducer 11b is provided between the distal-end swing part 7 and the second arm part 5 so as to allow the distal-end swing part 7 to be rotated about the fourth axis D with respect to the second arm part 5.

In this embodiment, as shown in FIGS. 1 to 3, the first arm part 4 and the second arm part 5 have shapes extending straight along the longitudinal directions thereof.

The turning part 3 is provided with a disc-shaped portion 12 whose central axis is the second axis B. The disc-shaped portion 12 is disposed along the vertical direction at a position offset toward one side in the horizontal direction, with respect to the first axis A.

As shown in FIG. 3, a side surface 12a on one side of the disc-shaped portion 12 in the direction along the second axis B (on the right side in the plane of FIG. 3) and a side surface 5a on the same side of the second arm part 5 are arrayed substantially in the same plane with no difference in lateral position therebetween.

Furthermore, the first arm part 4 is disposed close to side surfaces 12b and 5b on the other sides of the disc-shaped portion 12 of the turning part 3 and the second arm part 5 in the direction along the second axis B (on the left side in the plane of FIG. 3). Furthermore, the distal-end swing part 7 is disposed close to the side surface 5b on the other side of the second arm part 5.

Accordingly, the turning part 3, the first arm part 4, the second arm part 5, and the distal-end swing part 7 are arranged in an alternating manner at the one side or at the other side in the direction along the second axis B, from the turning part 3 toward the distal-end swing part 7.

Then, the first axis A, about which the turning part 3 is rotated, and a longitudinal axis E of the distal-end swing part 7 are disposed at positions so as to intersect with each other.

The first to third actuators 9, 10, and 11 are all disposed at the other side in the direction along the second axis B.

Then, a cable 13 for supplying power and signals to the actuators 9, 10, and 11 is disposed, from the turning part 3 to the distal-end swing part 7, at the one side of the turning part 3, the first arm part 4, and the second arm part 5 in the direction along the second axis B.

The reducers 9b, 10b, and 11b of the actuators 9, 10, and 11 are provided with: case parts 14, 15, and 16 to which the motors 9a, 10a, and 11a are fixed, respectively; and output shaft parts 17, 18, and 19 that are rotated with respect to the case parts 14, 15, and 16, respectively.

In this embodiment, the case part 14 of the reducer 9b for the first actuator 9 is fixed to the first arm part 4, and the output shaft part 17 thereof is fixed to the disc-shaped portion 12 of the turning part 3. Furthermore, the case part 15 of the reducer 10b for the second actuator 10 is fixed to the first arm part 4, and the output shaft part 18 thereof is fixed to the second arm part 5. Furthermore, the case part 16 of the reducer 11b for the third actuator 11 is fixed to the distal-end swing part 7, and the output shaft part 19 thereof is fixed to the second arm part 5.

When driving the motor 9a, the first actuator 9 can rotate the first arm part 4, to which the motor 9a and the case part 14 are fixed, about the second axis B, with respect to the output shaft part 17, which is held in the stationary state by being fixed to the disc-shaped portion 12 of the turning part 3.

When driving the motor 10a, the second actuator 10 can rotate the second arm part 5, to which the output shaft part 18 is fixed, about the third axis C, with respect to the case part 15, which is held in the stationary state by being fixed to the first arm part 4.

When driving the motor 11a, the third actuator 11 can rotate the distal-end swing part 7, to which the motor 11a and the case part 16 are fixed, about the fourth axis D, with respect to the output shaft part 19, which is held in the stationary state by being fixed to the second arm part 5.

The cable 13, which supplies power and signals, is connected to the motors 9a, 10a, and 11a of the actuators 9, 10, and 11. The cable 13 extends from a switchboard located at the rear of the base 2 toward the inside of the base 2 and passes through the vicinity of the first axis A of the turning part 3. When entering the turning part 3, part of the cable 13 is connected to the motor 8a of the actuator 8, which rotates the turning part 3 about the first axis A, and the rest of the cable 13 is exposed to the outside of the turning part 3.

As shown in FIG. 3, a section of the cable 13 that is exposed to the outside of the turning part 3 is provided with: a main line 13a that is wired so as to extend up to the distal-end swing part 7 along the side surface 12a on the one side of the disc-shaped portion 12 of the turning part 3 and the side surface 5a on the one side of the second arm part 5; and branch lines 13b that branch at a middle position. The main line 13a is supported, at middle positions in the longitudinal direction, by supporting members 20 that are provided on the side surface of the turning part 3, on the side surface of the first arm part 4, on the side surface of the second arm part 5, and on the distal-end swing part 7. As shown in FIGS. 1 and 2, the distal end of the main line 13a is connected to the motor 11a of the third actuator 11, which rotationally drives the distal-end swing part 7, and to motors 7a, 7b, and 7c that drive the wrist part 6, which is mounted on the distal-end swing part 7.

The respective supporting members 20 are set to have appropriate lengths such that the main line 13a of the cable 13 extends along the plane extending along the turning part 3 and the side surface 5a on the one side of the second arm part 5. In particular, the supporting member 20 that supports the cable 13 with respect to the first arm part 4 extends so as to protrude from a side surface of the first arm part 4 that is located close to the turning part 3 and the side surface 5b on the other side of the second arm part 5, toward the side surface on the one side by passing through a space between the disc-shaped portion 12 of the turning part 3 and the second arm part 5.

The branch lines 13b of the cable 13 are branched from the main line 13a at the position of this supporting member 20 provided on the first arm part 4, and extend toward the first arm part 4 along this supporting member 20. The first arm part 4 has a through-hole 21 penetrating therethrough in the direction along the second axis B, in the vicinity of the position where this supporting member 20 is fixed. The branch lines 13b pass through the through-hole 21 and are connected to the motors 9a and 10a of the first and second actuators 9 and 10.

The operation of the thus-configured robot 1 of this embodiment will be described below.

According to the robot 1 of this embodiment, because the distal-end swing part 7, which supports the wrist part 6 at the distal end thereof, is supported by the first arm part 4 and the second arm part 5, which are serially coupled with respect to the turning part 3, the operating range of the wrist part 6 can be maximized by extending the first arm part 4 and the second arm part 5 in a straight line.

Figure 5:
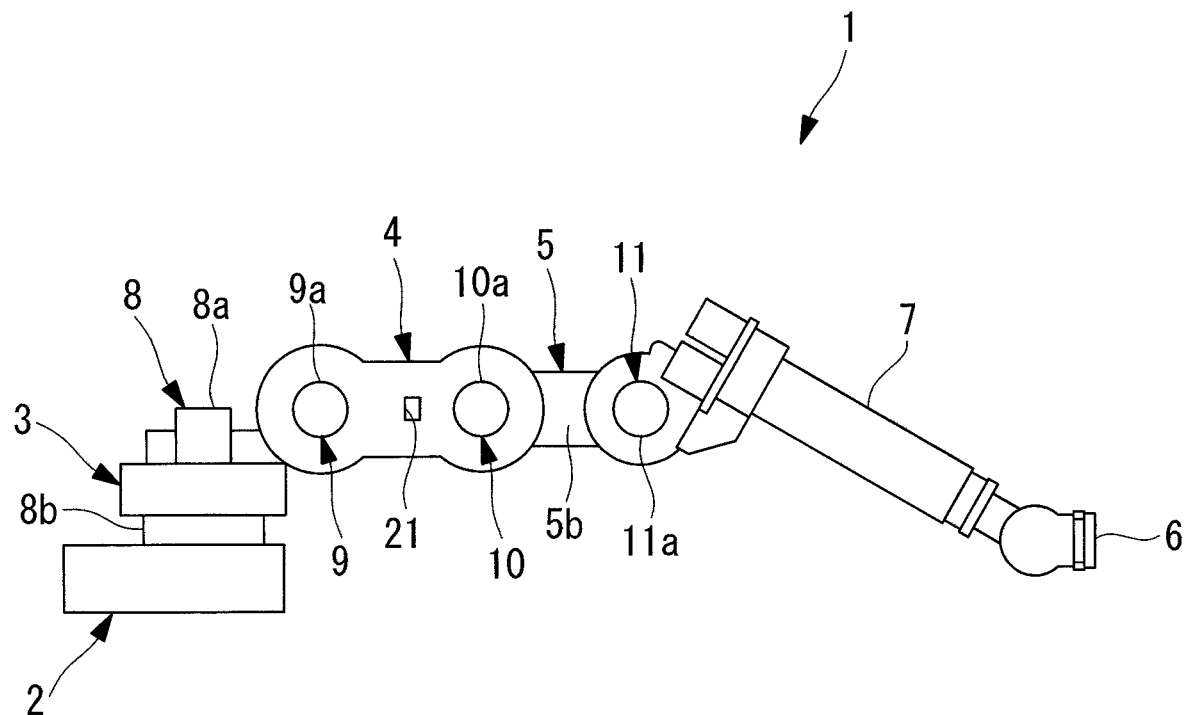
FIG. 5 is a side view showing a state in which a first arm part and a second arm part in the robot shown in FIG. 1 are extended to be the longest in length.

Specifically, as shown in FIG. 5, in a state in which the first arm part 4 and the second arm part 5 are made to extend in a straight line, the first actuator 9 is driven without driving the second actuator 10, thereby making it possible to operate the first arm part 4 and the second arm part 5 as a single long arm part and to dispose the wrist part 6 at three-dimensional positions over a wide operating range by combining rotation of the turning part 3 about the first axis A and rotation of the distal-end swing part 7 about the fourth axis D.

Figure 6:
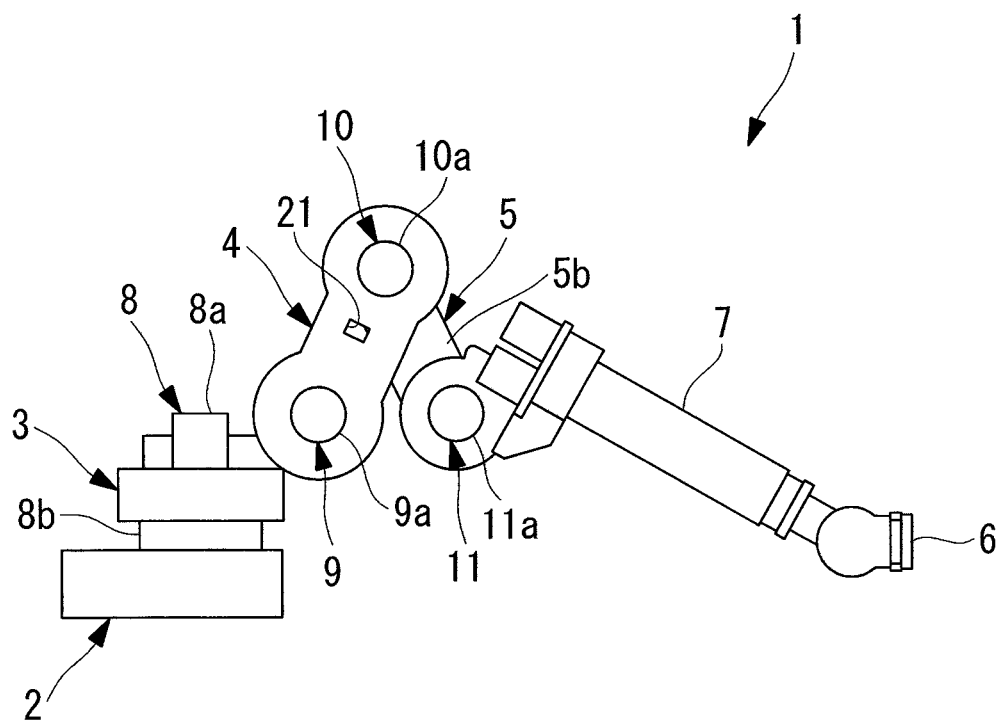
FIG. 6 is a side view showing a state in which the first arm part and the second arm part in the robot shown in FIG. 1 are folded to be the shortest in length.

On the other hand, as shown in FIG. 6, when the second arm part 5 is made to swing with respect to the first arm part 4, thus folding the arm parts, it is possible to reduce the distance between the second axis B and the fourth axis D, thus reducing the distance between the wrist part 6 and the turning part 3. Accordingly, while ensuring a wide operating range, a compact operation in a small radius is made possible, and compact arrangement is allowed by narrowing spaces with respect to peripheral devices and adjacent robots.

In this case, because the first arm part 4 and the second arm part 5 are formed into shapes so as to extend straight in the longitudinal direction thereof, and the turning part 3, the first arm part 4, the second arm part 5, and the distal-end swing part 7 are arranged in an alternating manner in the direction along the second axis B, as shown in FIG. 4, it is possible to suppress the overall widthwise size of the robot 1 even if the first arm part 4 or the second arm part 5 is not bent in a crank manner.

Then, as shown in FIG. 3, the cable 13 is disposed along the side surfaces 5a and 12a on the one side in the direction of the second axis B, which are arrayed with no difference in lateral position between the second arm part 5 and the turning part 3, thereby making it possible to route the cable 13 via a comfortable wiring route only causing it to be bent in one direction along the side surfaces 5a and 12a on the one side therein, according to the operations of the first arm part 4, the second arm part 5, and the distal-end swing part 7, and to easily install or remove the cable 13.

Furthermore, because the first arm part 4 or the second arm part 5 is not bent in a crank manner, unlike a conventional technique, there is an advantage in that the occurrence of an excessive stress concentration on the first arm part 4 and the second arm part 5 is prevented, and the strength and the rigidity of the first arm part 4 and the second arm part 5 can be improved.

Furthermore, a straight form without being bent in a crank manner is adopted, thereby making it possible to form the first arm part 4 and the second arm part 5 into flat shapes.

By forming the first and second arm parts 4 and 5 into flat shapes, it is possible to reduce the volume of a mold used to cast the first arm part 4 and the second arm part 5, and to minimize the number of reinforcing ribs for avoiding an excessive stress concentration, thus preventing a mold from being complicated. As a result, it is possible to improve the ease of manufacture of the first arm part 4 and the second arm part 5 and to significantly reduce the cost.

Furthermore, by preventing an increase in thickness for avoiding an excessive stress concentration and by minimizing the number of reinforcing ribs, there is an advantage in that it is possible to reduce the weights of the first arm part 4 and the second arm part 5 themselves, thus reducing the cost, and to improve, due to the weight reduction, the control of the first arm part 4 and the second arm part 5 performed by the first actuator 9 and the second actuator 10.

Furthermore, because the branch lines 13b, which are branched from the main line 13a of the cable 13, are not routed along to the outer surfaces of the first arm part 4 but are made to pass through the through-hole 21, which is provided in the first arm part 4, the cable 13 does not bulge out, thus making it possible to prevent the cable 13 from being caught on a peripheral device or the like. Accordingly, the cable 13 can be more reliably protected.

Furthermore, according to the robot 1 of this embodiment, because the first actuator 9 and the second actuator 10 are attached to the first arm part 4, which is formed so as to extend straight, from the same direction, there is an advantage in that assembly is easier compared with a conventional structure in which the first arm part 4 is bent in a crank manner. Specifically, a unit that is obtained by attaching the case part 14 of the reducer 9b for the first actuator 9 and the case part 15 of the reducer 10b for the second actuator 10 to the first arm part 4 can be mounted to the disc-shaped portion 12 of the turning part 3; thus, the assembly work is easy.

Furthermore, because the motor 9a of the first actuator 9 and the motor 10a of the second actuator 10 are both fixed to the first arm part 4 from the same direction, the first arm part 4 and the two motors 9a and 10a are integrally moved without being relatively moved. Therefore, the branch lines 13b of the cable 13 for the two actuators 9 and 10 are wired along the common route passing through the through-hole 21 of the first arm part 4.

As a result, unlike a conventional structure in which the motor 9a of the first actuator 9 is fixed to the turning part 3, and the motor 10a of the second actuator 10 is fixed to the first arm part 4, it is easy to provide a cover 22 or the like for covering the motors 9a and 10a for the two actuators 9 and 10 and the cable 13, as indicated by the dot-dash line in FIG. 3.

Furthermore, according to the robot 1 of this embodiment, there is an advantage in that a relatively large space can be formed with respect to the turning part 3, which is disposed in a space radially outward of the second arm part 5 about the third axis C.

Figure 7:
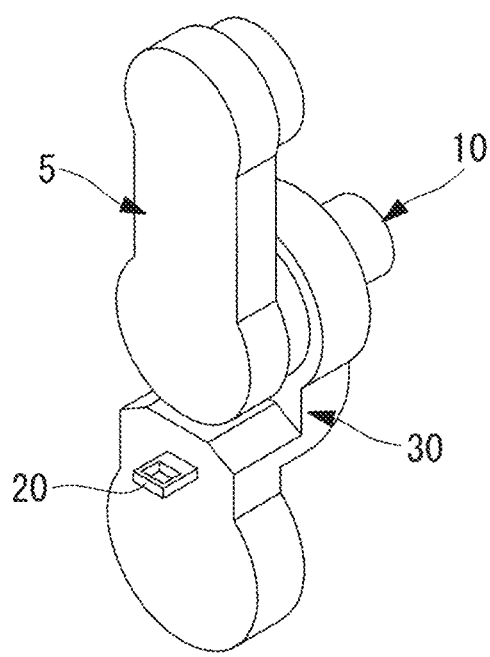
FIG. 7 is a partial perspective view for explaining interference between a second arm part and a first arm part of a robot having a conventional structure.
Figure 8:
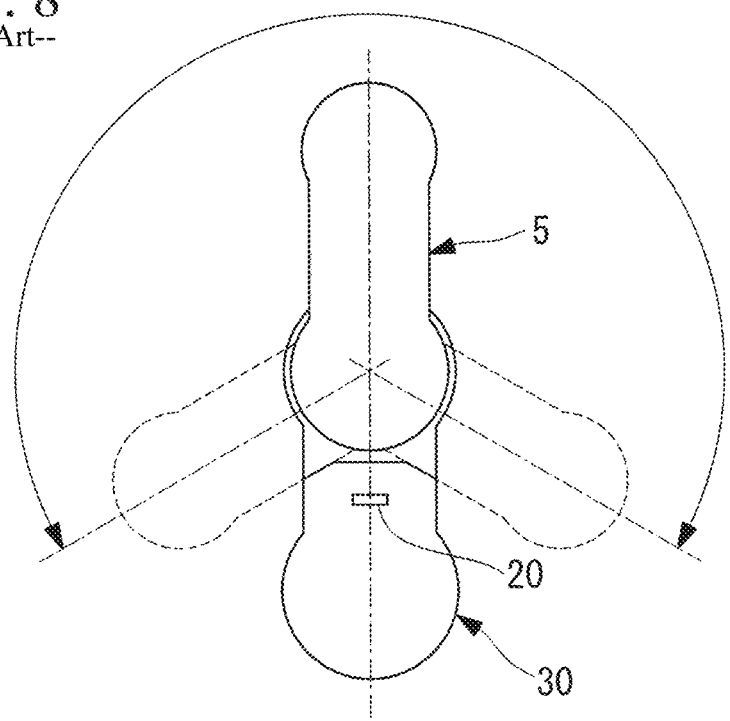
FIG. 8 is a partial side view for explaining a restriction of the operating range of the second arm part due to the interference in FIG. 7.

Specifically, as in a conventional structure shown in FIG. 7, if a first arm part 30 is bent in a crank manner, a section of the first arm part 30 that is bent in a crank manner is closely disposed in a space radially outward of the second arm part 5 about the third axis C; thus, as shown in FIG. 8, the operating range of the second arm part 5 about the third axis C is limited to a relatively narrow range due to the interference with the first arm part 30.

Figure 9:
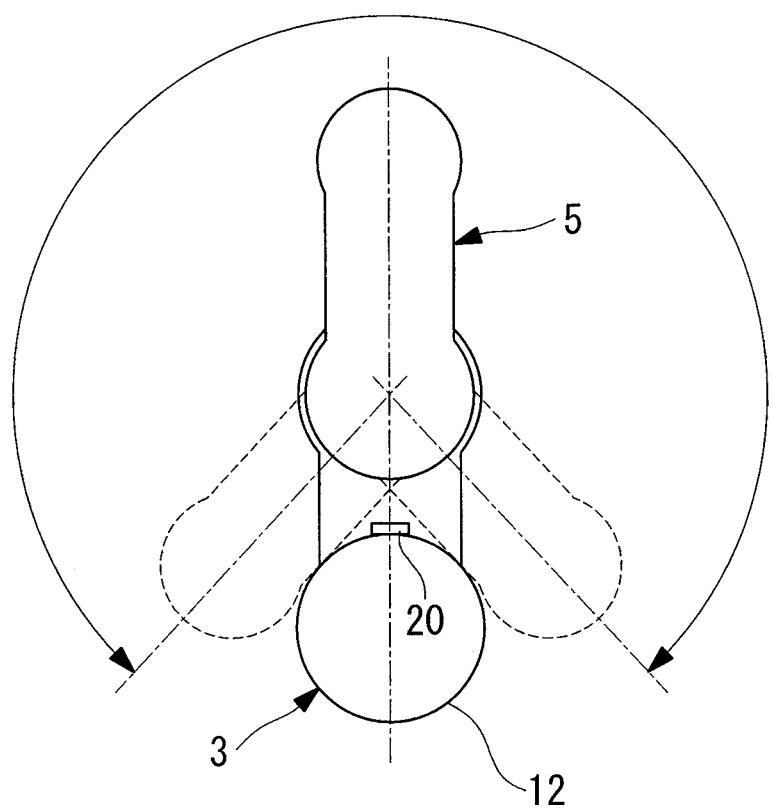
FIG. 9 is a partial side view for explaining the operating range of the second arm part of the robot shown in FIG. 1.

In contrast to this, according to the robot 1 of this embodiment, when the distance between the second axis B and the third axis C is set the same as in the conventional structure, as shown in FIG. 9, because the section of the first arm part 30 that is bent in a crank manner does not exist, it is possible to dispose the disc-shaped portion 12 of the turning part 3 at a position radially separated from the second arm part 5 and to secure a wide operating range of the second arm part 5 about the third axis C.

Figure 10:
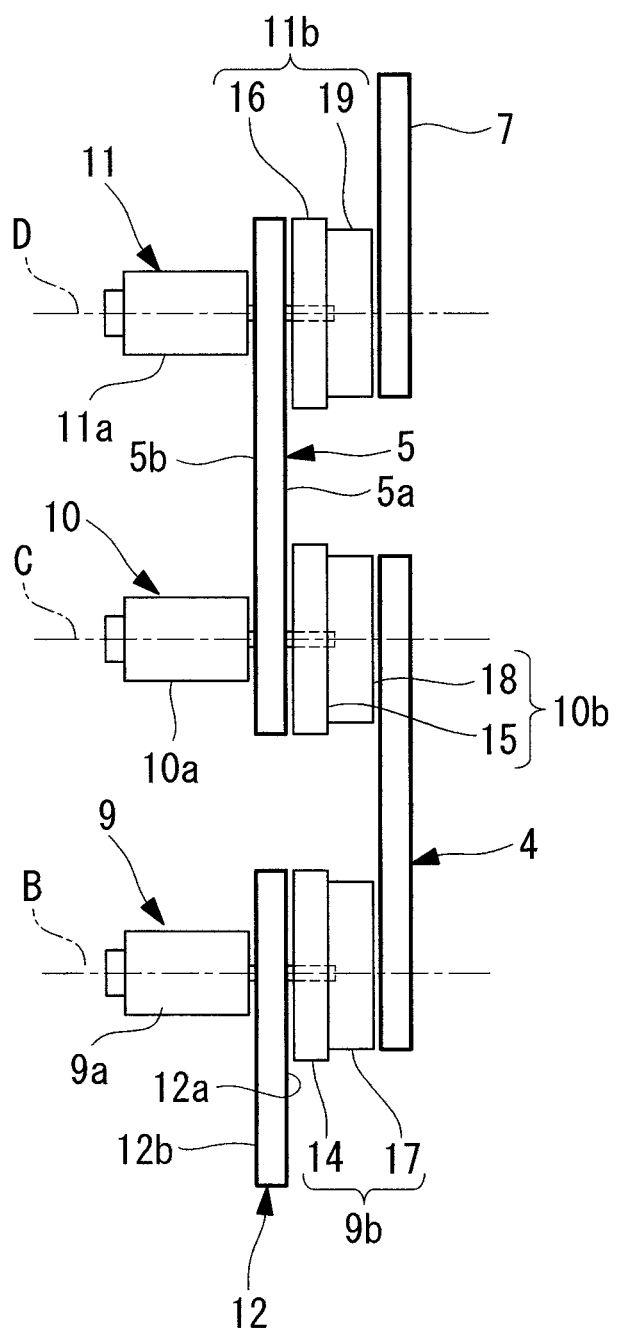
FIG. 10 is a front view schematically showing a modification of the robot shown in FIG. 1.

Note that, in this embodiment, although the turning part 3, the first arm part 4, the second arm part 5, and the distal-end swing part 7 are arranged in an alternating manner in the direction along the second axis B, in the order in which the disc-shaped portion 12 of the turning part 3 is offset toward one side with respect to the first axis A, and the first arm part 4 connected to the turning part 3 is disposed in the vicinity of the first axis A, instead of this, they may be arranged as shown in FIG. 10. Specifically, the turning part 3, the first arm part 4, the second arm part 5, and the distal-end swing part 7 may be arranged in an alternating manner in the direction along the second axis B, in the order in which the disc-shaped portion 12 of the turning part 3 is disposed in the vicinity of the first axis A, and the first arm part 4 is disposed at a position offset toward one side from the first axis A.

In this case, the supporting member 20 that supports the cable 13 with respect to the second arm part 5 passes through a space between the first arm part 4 and the distal-end swing part 7 to extend up to a position beyond the second arm part 5.

As a result, the above-described embodiment leads to the following aspect.

The present invention provides the following solutions.

According to one aspect, the present invention provides a robot including: a turning part that can be rotated about a first axis; a first arm part that is connected to the turning part in a rotatable manner about a second axis extending in a direction perpendicular to the first axis and that extends straight along the longitudinal direction thereof; a second arm part that is connected to the first arm part in a rotatable manner about a third axis parallel to the second axis and that extends straight along the longitudinal direction thereof; a distal-end swing part that is connected to the second arm part in a rotatable manner about a fourth axis parallel to the third axis and that supports a wrist part at the distal end thereof; a first actuator that rotates the first arm part with respect to the turning part; a second actuator that rotates the second arm part with respect to the first arm part; a third actuator that rotates the distal-end swing part with respect to the second arm part; and a cable that supplies power and signals to the first to third actuators, wherein the turning part, the first arm part, the second arm part, and the distal-end swing part are arranged in an alternating manner at one side or at the other side in the direction along the second axis, from the turning part toward the distal-end swing part; the cable is disposed along a side surface at the one side; and the first to third actuators are disposed close to a side surface at the other side.

According to this aspect, because the distal-end swing part, which supports the wrist part at the distal end thereof, is supported by the first arm part and the second arm part, which are serially connected to the turning part, when the first arm part and the second arm part are extended in a straight line, the operating range of the wrist part can be maximized. On the other hand, when the second arm part is made to swing with respect to the first arm part, thus folding the arm parts, it is possible to reduce the distance between the second axis and the fourth axis, thus reducing the distance between the wrist part and the turning part, and to allow compact arrangement by narrowing spaces with respect to peripheral devices.

In this case, because the first arm part and the second arm part have shapes extending straight along the longitudinal directions thereof, and the turning part, the first arm part, the second arm part, and the distal-end swing part are disposed in an alternating manner in the direction along the second axis, it is possible to suppress the overall widthwise size of the robot even if the first arm part or the second arm part is not bent in a crank manner. Furthermore, the cable is disposed along the side surface at one side in the direction of the second axis, thereby making it possible to route the cable so as to be bent comfortably according to the operations of the first arm part, the second arm part, and the distal-end swing part and to easily install or remove the cable.

Furthermore, because the first arm part or the second arm part is not bent in a crank manner, it is possible to prevent the occurrence of an excessive stress concentration on the first arm part and the second arm part and to improve the strength and the rigidity of the first arm part and the second arm part. Furthermore, an increase in thickness for avoiding an excessive stress concentration and the number of reinforcing ribs are minimized, thus improving the ease of manufacturing, and cost reduction and improved controllability due to weight reduction can be achieved.

In the above-described aspect, side surfaces on the one side of the turning part and the second arm part may be disposed close to each other in the same plane; and the first arm part and the distal-end swing part may be disposed along side surfaces on the other side of the turning part and the second arm part.

By doing so, the difference in lateral position between the side surfaces on the one side of the turning part and the second arm part is reduced, and the cable can be disposed along the side surfaces.

Furthermore, in the above-described aspect, the cable may include: a main line that is wired along side surfaces on the one side of the turning part and the second arm part; and branch lines that are branched from the main line at a middle position of the main line in the longitudinal direction; and the branch lines may pass through a through-hole formed, at a middle position of the first arm part in the longitudinal direction, in the direction along the second axis and may be wired to the first actuator and the second actuator.

By doing so, the branch lines, which are branched from the main line of the cable, can be made to pass through the through-hole, which is formed in the first arm part, and can be easily wired to the first actuator and the second actuator, which are disposed on the side surfaces at the other side in the direction of the second axis. Because the branch lines are not wired around the outer side of the first arm part, the branch lines can be protected by reliably preventing interference with peripheral devices.

Furthermore, in the above-described aspect, it is also possible to further include supporting members that support the main line of the cable with respect to the turning part, the first arm part, and the second arm part, wherein the supporting member that is fixed to the first arm part passes between the turning part and the second arm part in the direction along the second axis and extends so as to protrude toward the side surfaces on the one side thereof, thus supporting the main line.

Compared with a conventional structure in which the first arm part is bent in a crank manner, it is not necessary to cause a bent section of the first arm part to pass through a space between the turning part and the second arm part, and it is possible to form the space between the turning part and the second arm part if the distance between the first axis and the second axis is the same.

By doing so, it is possible to support the main line of the cable with respect to the first arm part by means of the supporting member that protrudes from the first arm part toward the side surface at one side by passing through the space in the direction along the second axis, and to cause the cable to be bent according to the rotation of the first arm part.

Furthermore, in the above-described aspect, the longitudinal axis of the distal-end swing part may be located at a position so as to intersect with the first axis.

By doing so, the first axis, about which the turning part is rotated, and the longitudinal axis of the distal-end swing part are coaxially disposed, thus making it easy to perform control.

According to the present invention, an advantageous effect is afforded in that it is possible to improve the strength and the rigidity by reducing a stress concentration that occurs in a first arm part and a second arm part, to achieve improved controllability due to weight reduction and cost reduction, and to secure a wide operating range.

REFERENCE SIGNS LIST 1 robot
3 turning part
4 first arm part
5 second arm part 5a side surface on one side
5b side surface on the other side
6 wrist part
7 distal-end swing part
9 first actuator (actuator)
10 second actuator (actuator)
11 third actuator (actuator)
12a side surface on one side
12b side surface on the other side
13 cable
13a main line
13b branch line
20 supporting member
21 through-hole
A first axis
B second axis
C third axis
D fourth axis
E longitudinal axis

The invention claimed is:

1. A robot comprising:
a turning part that rotates about a first axis;
a first arm part that is connected to the turning part in a rotatable manner about a second axis extending in a direction perpendicular to the first axis and that extends straight along a longitudinal direction thereof;
a second arm part that is connected to the first arm part in a rotatable manner about a third axis parallel to the second axis and that extends straight along a longitudinal direction thereof;
a distal-end swing part that is connected to the second arm part in a rotatable manner about a fourth axis parallel to the third axis and that supports a wrist part at a distal end thereof;
a first actuator that rotates the first arm part with respect to the turning part;
a second actuator that rotates the second arm part with respect to the first arm part;
a third actuator that rotates the distal-end swing part with respect to the second arm part; and
a cable that supplies power and signals to the first to third actuators; and supporting members that support a main line of the cable with respect to the turning part, the first arm part, and the second arm part, wherein the cable comprises: the main line that is wired along side surfaces on one side of the turning part and the second arm part; and branch lines that are branched from the main line at a middle position in a longitudinal direction of the main line; and the branch lines pass through a through-hole formed, at a middle position in the longitudinal direction of the first arm part, in a direction along the second axis and are wired to the first actuator and the second actuator
wherein the turning part, the first arm part, the second arm part, and the distal-end swing part are arranged in an alternating manner at the one side or at another side in the direction along the second axis, from the turning part toward the distal-end swing part;
the side surfaces on the one side of the turning part and the second arm part are disposed proximate to each other in the same plane;
the first arm part and the distal-end swing part are disposed along side surfaces on the other side of the turning part and the second arm part;
the cable is disposed along the side surfaces on the one side of the turning part and the second arm part along the side surfaces;
the first to third actuators are disposed proximate to the side surfaces at the other side; and
the supporting member that is fixed to the first arm part passes between the turning part and the second arm part in the direction along the second axis and extends so as to protrude toward the side surfaces on the one side thereof, thus supporting the main line.

2. The robot according to claim 1, wherein the distal-end swing part has a longitudinal axis, and the longitudinal axis of the distal-end swing part is located at a position so as to intersect with the first axis.

* * * * *